(12) United States Patent
Jin et al.

(10) Patent No.: US 11,630,856 B2
(45) Date of Patent: Apr. 18, 2023

(54) HANDLING OF POINT OF INTEREST (POI) DATA CONTENT

(71) Applicant: Business Objects Software Ltd., Dublin (IE)

(72) Inventors: Xing Jin, Vancouver (CA); Sumedha Sharma, Vancouver (CA); James Lloyd, Vancouver (CA)

(73) Assignee: BUSINESS OBJECTS SOFTWARE LTD, Dublin (IE)

( * ) Notice: Subject to any disclaimer, the term of this patent is extended or adjusted under 35 U.S.C. 154(b) by 428 days.

(21) Appl. No.: 16/710,994

(22) Filed: Dec. 11, 2019

(65) Prior Publication Data

US 2021/0182320 A1 Jun. 17, 2021

(51) Int. Cl.
*G06F 16/29* (2019.01)
*G01C 21/34* (2006.01)
*G06F 16/2457* (2019.01)

(52) U.S. Cl.
CPC ......... *G06F 16/29* (2019.01); *G01C 21/3476* (2013.01); *G06F 16/24573* (2019.01)

(58) Field of Classification Search
CPC .... G06F 16/29; G06F 16/24573; G06F 16/00; G01C 21/3476; G01C 21/00; G01C 21/3682
See application file for complete search history.

(56) References Cited

U.S. PATENT DOCUMENTS

| | | | | |
|---|---|---|---|---|
| 7,599,937 | B2* | 10/2009 | Dutta | G06F 21/6227 707/999.009 |
| 2005/0251331 | A1* | 11/2005 | Kreft | G01C 21/00 701/438 |
| 2009/0047972 | A1* | 2/2009 | Neeraj | G06Q 10/10 455/456.1 |
| 2010/0036834 | A1* | 2/2010 | Bandas | G01C 21/3655 707/724 |
| 2018/0084517 | A1* | 3/2018 | Do | H04W 60/00 |
| 2018/0112996 | A1* | 4/2018 | Montell | G01C 21/3682 |
| 2020/0050683 | A1* | 2/2020 | Mathai | G06F 16/168 |

* cited by examiner

*Primary Examiner* — Brittany N Allen
*Assistant Examiner* — William P Bartlett
(74) *Attorney, Agent, or Firm* — Fountainhead Law Group P.C.

(57) ABSTRACT

Point-of-Interest (POI) data is stored according to a first, POI library as a flat file in a database. An engine is positioned between the POI library and an interface. The interface is configured to interact with data structured in a hierarchical manner and stored according to a second library (e.g., a modeling interface utilizing folders). The engine functions to wrap a POI object taken from a table of the POI library, into an augmented object recognized and handled by the second library of the (hierarchical) interface. To accomplish this, the engine augments the POI table with an additional column that is to be indexed by the second library. In this manner, embodiments may impart additional, hierarchy-based functionality to existing POI handling schemes. Particular embodiments may impart enhanced security (e.g., permissions at the data object-level) to existing POI schemes that implement permissions only at the POI-level and/or at the application-level.

19 Claims, 7 Drawing Sheets

```
Entity POI_LAYERS
{
    key LAYERID: Integer not null;
    NAME: String(50);
    DESCRIPTION: String(200);
    SCHEMA: String(100);
    VIEW: String(100) not null;
    ENTITYID: String(100) not null;
    LEVEL: hana.TINYINT;
    PARENTKEY: String(100);
    IDFIELD: String(100) not null;
    ISENABLED: hana.TINYINT default 1;
    CREATEDBY: String(100) default '---';
    CREATEDON: LocalDate default CURRENT_DATE;
    CHANGEDBY: String(100) default '---';
    CHANGEDON: LocalDate default CURRENT_DATE;
    DATASOURCE: hana.TINYINT default 1;
    VIEWTYPE: String(100) default '---';
    REMOTE_SYSTEMNAME: String(400) default '---';
    REMOTE_SCHEMA: String(400) default '---';
    REMOTE_VIEW: String(400) default '---';
    REMOTE_ENTITYID: String(400) default '---';
    RESOURCE_ID: String(256) default '';
};
```

FIG. 4

HANDLING OF POINT OF INTEREST (POI) DATA CONTENT

BACKGROUND

Unless otherwise indicated herein, the approaches described in this section are not prior art to the claims in this application and are not admitted to be prior art by inclusion in this section.

Points of Interest (POIs) are multi-dimensional data structures linking semantic information with geographic data, as may be presented on a map interface. For example, a POI may include measures and dimensions, together with the specific latitudes and longitudes of various different geographic locations. User interaction with the POI on a map interface, may result in a user intuitively accessing other stored data relevant to the POI or the user's overall analytic investigation.

POIs may be stored and offered to customers according to a relatively simple structure, such as a single, lengthy, flat list systemwide (per tenant). Such a lack of complex organization of POI data can reduce the efficiency of browsing, and can also potentially raise security concerns.

SUMMARY

Point-of-Interest (POI) data is stored according to a first, POI library as a flat file in a database. An engine is positioned between the POI library and an interface. The interface is configured to interact with data structured in a hierarchical manner and stored according to a second library (e.g., a modeling interface utilizing folders). The engine functions to wrap a POI object taken from a table of the POI library, into an augmented object recognized and handled by the second library of the (hierarchical) interface. To accomplish this, the engine augments the POI table with an additional column that is to be indexed by the second library. In this manner, embodiments may impart additional, hierarchy-based functionality to existing POI handling schemes. Particular embodiments may impart enhanced security (e.g., permissions at the object-level) to existing POIs implementing permissions only at the POI-level and/or at the application-level.

The following detailed description and accompanying drawings provide a better understanding of the nature and advantages of various embodiments.

BRIEF DESCRIPTION OF THE DRAWINGS

FIG. 4 shows changes to a POI table that are made according to the example.

DETAILED DESCRIPTION

Described herein are methods and apparatuses for handling point of interest information. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
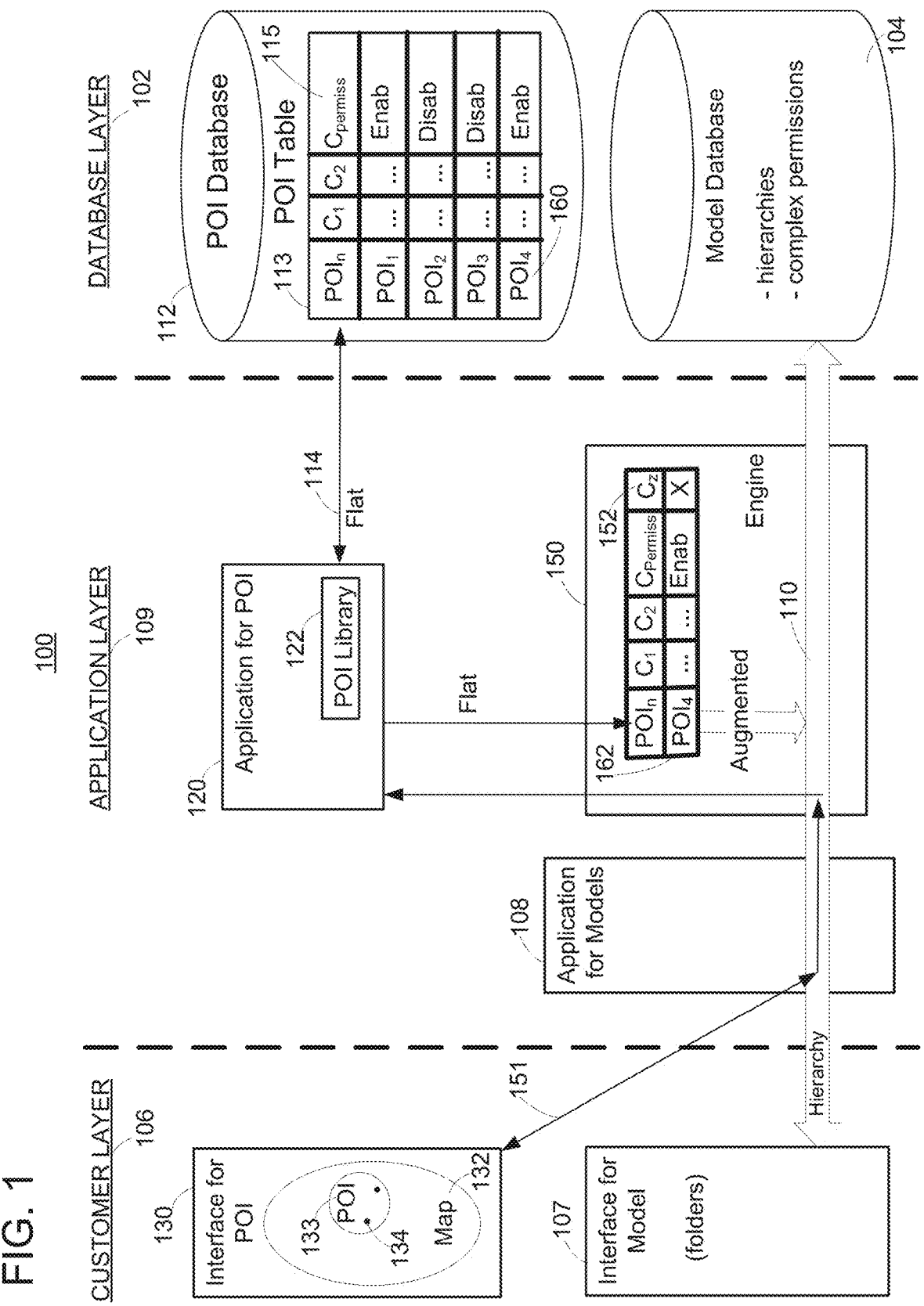
FIG. 1 shows a simplified diagram of a system according to an embodiment.

FIG. 1 shows a simplified view of an example system that is configured to implement POI data handling according to an embodiment. Specifically, system 100 comprises a database layer 102 that includes a model database 104. The model database is organized in a hierarchical manner, comprising complex data objects that can include measures, dimensions, and filters.

A user located in the customer layer 106, uses a model interface 107 to access data of the model data via a model application 108 located in the application layer 109. That model application comprises an interface that is configured to recognize and handle data organized into folders according to a hierarchy 110.

The database layer also includes a Point of Interest (POI) database 112. The POI database is organized in POI tables 113 exhibiting a relatively simple, flat structure 114. These POI tables comprise lists of individual POIs ($POI_n$), together with associated data in various columns. One such column ($C_{permiss}$) 115 may allow for implementing permissions for individual POIs in only a relatively simple, rudimentary manner (e.g., either as Enabled or Disabled).

A separate application 120 for interacting with the POI database, may also be located in the application layer. The POI application may access the POI data of the POI database according to a POI library 122, that is based upon the flat structure of the POI table.

A user in the customer layer seeks to access POI data from the POI database. In particular, an interface 130 (e.g., geomapping interface) may display a geographic map 132 which includes the POI 133 comprising multiple physical locations 134.

Various types of data associated with the POI may be stored in the POI database. These can include but are not limited to the latitudes and longitudes (in degrees, minutes, seconds) of each of the different physical locations of the POI.

Engine 150 is positioned in the application layer, between the modeling application and the POI application. The engine is configured to receive a query 151 for POI data, from the POI interface via the model interface.

The engine forwards the query to the POI application for execution on the POI data of the POI database. In return, engine receives from the POI application, a corresponding query result including a relevant POI object 160.

Then, the engine functions to wrap a POI object taken from a table of the POI library, into an augmented object 162. That augmented object exhibits a hierarchical structure that is recognized and understood by the modeling application. In order to accomplish this, the POI table is augmented with an additional column 152 that is to be indexed by the modeling application.

This augmentation by the engine, permits accessing the POI data in a hierarchical manner (e.g., utilizing folder-type organization). As detailed below in the example, such hierarchical handling of POI data can impart desirable usage characteristics, such as the implementation of a complex security scheme with permissions applied at multiple levels.

Figure 2:
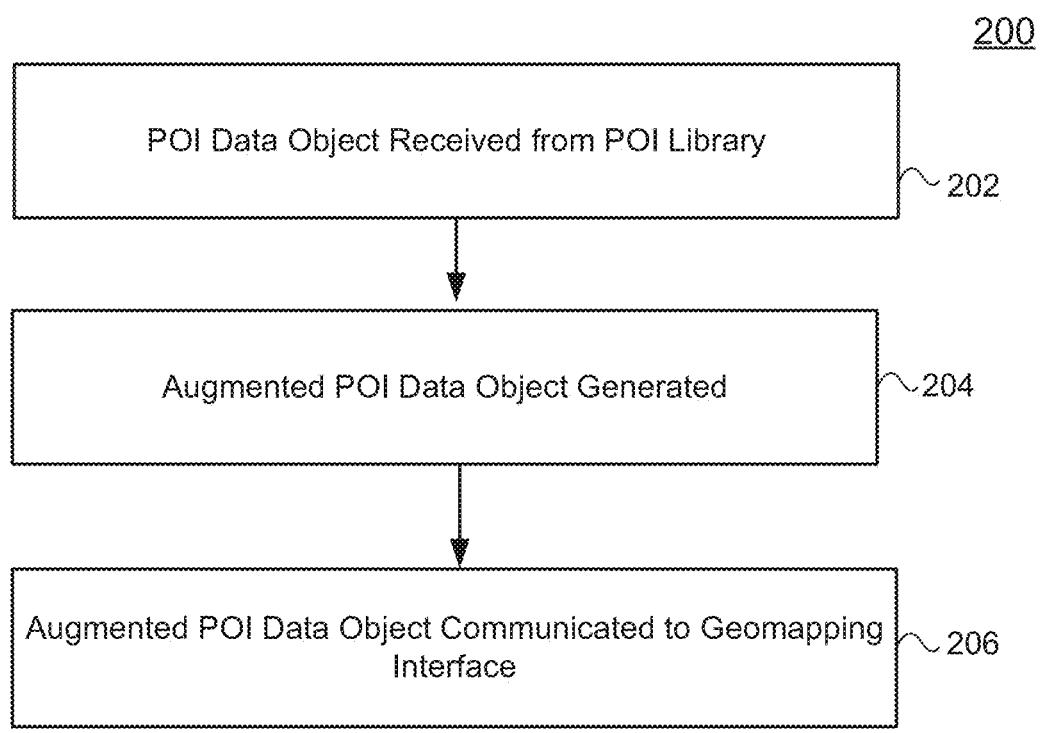
FIG. 2 shows a simplified flow diagram of a method according to an embodiment.

FIG. 2 is a flow diagram showing various actions taken in a method 200 according to an embodiment. At 202, a POI data object comprising a plurality of columns is received from a POI library.

At 204, an augmented POI data object is created from the POI data object. This augmenting may involve adding a column that may be referenced for indexing by a hierarchical interface.

At 206, the augmented POI data object is communicated to a geomapping interface (e.g., via the hierarchical interface).

Embodiments may offer certain benefits over conventional approaches. For example, certain embodiments accomplish POI handling with little change to an existing POI library, thereby maintaining quality.

Some embodiments may offer a relatively low development cost, as the existing file handling functionality of a model interface is leveraged to handle POI information.

Embodiments can offer a range of benefits to users of different levels. For example, data administrators may experience ease in organizing POIs within folders, and granting access to folders and POIs tailored to individual users or work teams. Content creators may be able to create POIs in certain folders, and then take advantage of that folder functionality to share POIs to users or teams. Users are also able to readily consume the POIs that are available.

Lastly, upon completion of an upgrade, certain embodiments allow simple permissions (of existing POIs stored in a long flat list rather than a folder schema) to be effectively migrated without substantial change.

Further details regarding POI information handling, are now provided in connection with a particular example involving specific elements available from SAP SE, of Walldorf, Germany.

Example

The SAP Analytic Cloud (SAC) data storage platform available from SAP SE, is adapted to achieve POI information handling according to embodiments. To facilitate storage and interaction with complex data models, a ContentLib API has been developed for SAC. That ContentLib offers folder-like organizing and granular access control for complex models.

Figure 3:
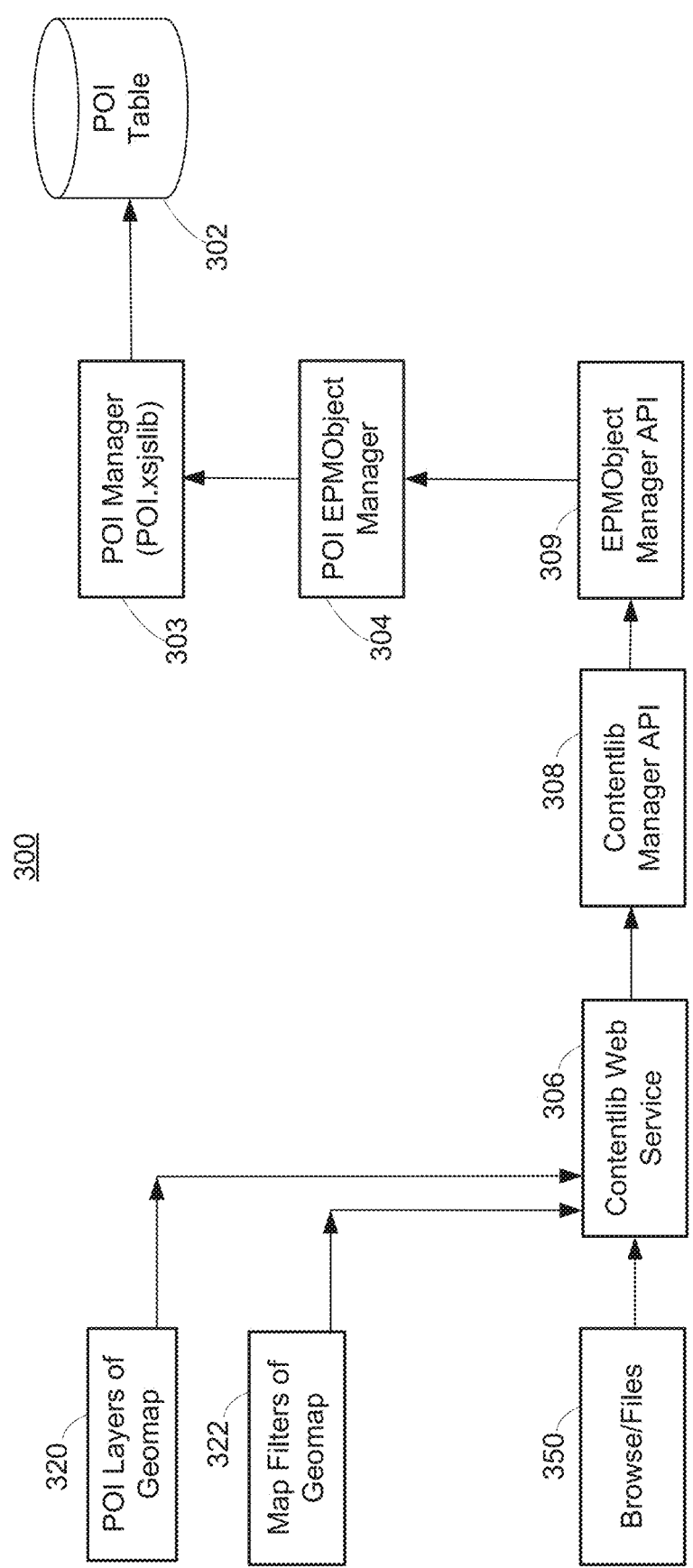
FIG. 3 shows a simplified block diagram of an embodiment of an architecture for POI handling according to an exemplary embodiment.

Here, this specific example leverages existing POI artifacts on top of the ContentLib API, in order to achieve enriched POI handling functionality. In particular, FIG. 3 shows a simplified view of an exemplary architecture 300 of an embodiment.

Specifically, POI data is stored in a POI table 302 accessible using the POI library 303. The POI data may be stored as a relatively simple, flat structure, lacking a hierarchical organization.

According to this example a mid-layer POI EPMObject Manager 304 is interposed between the POI Library, and the ContentLib web service 306, ContentLib manager API 308, and EPMObject Manager API 309. The ContentLib web service 306 is in communication with interface 350 that allows browsing of model information in a hierarchical (e.g., folder-like) manner.

This POI EPMObject Manager is a relatively thin layer that functions to wrap a POI object taken from a table of the POI library, into an EPM object recognized and understood by the ContentLib Library. In order to accomplish this, the POI table is augmented with an additional column that is to be indexed by the ContentLib Library.

FIG. 4 shows changes to the POI table (POI_LAYERS) that are made according to this example. This POI table includes columns indicating, e.g.:
the name of the POI (NAME);
a description of the POI (DESCRIPTION);
a simple permission scheme at the POI-level (ISENABLED);
the creator of the POI (CREATEDBY);
the date of creation of the POI (CREATEDON); as well as
others as listed in FIG. 4.

Now, according to embodiments, a new column (RESOURCE_ID) is added. The addition of this column augments the POI, allowing it to be handled in a hierarchical manner as recognized by the interface to the modeling application.

The following summarizes mapping between identifier fields according to this specific example:

| Semantic Meaning | ContentLib | EPMObject | POIObject |
|---|---|---|---|
| POI Object ID - (1:1 mapping to POI Resource ID) | (not stored) | (not stored) | LAYERID |
| POI Resource ID - (1:1 mapping to POI Object ID) | RESOURCE_ID | NAME | RESOURCE_ID |

Returning to FIG. 3, based upon the presence of the POI EPMObject Manager engine, calls to the POI API (e.g., as made from POI layers 320 and/or map filters 322 of a geomapping interface) are replaced with corresponding ContentLib API calls. This change is achieved at low cost, requiring relatively little modification to the existing POI and ContentLib infrastructures.

Figure 5:
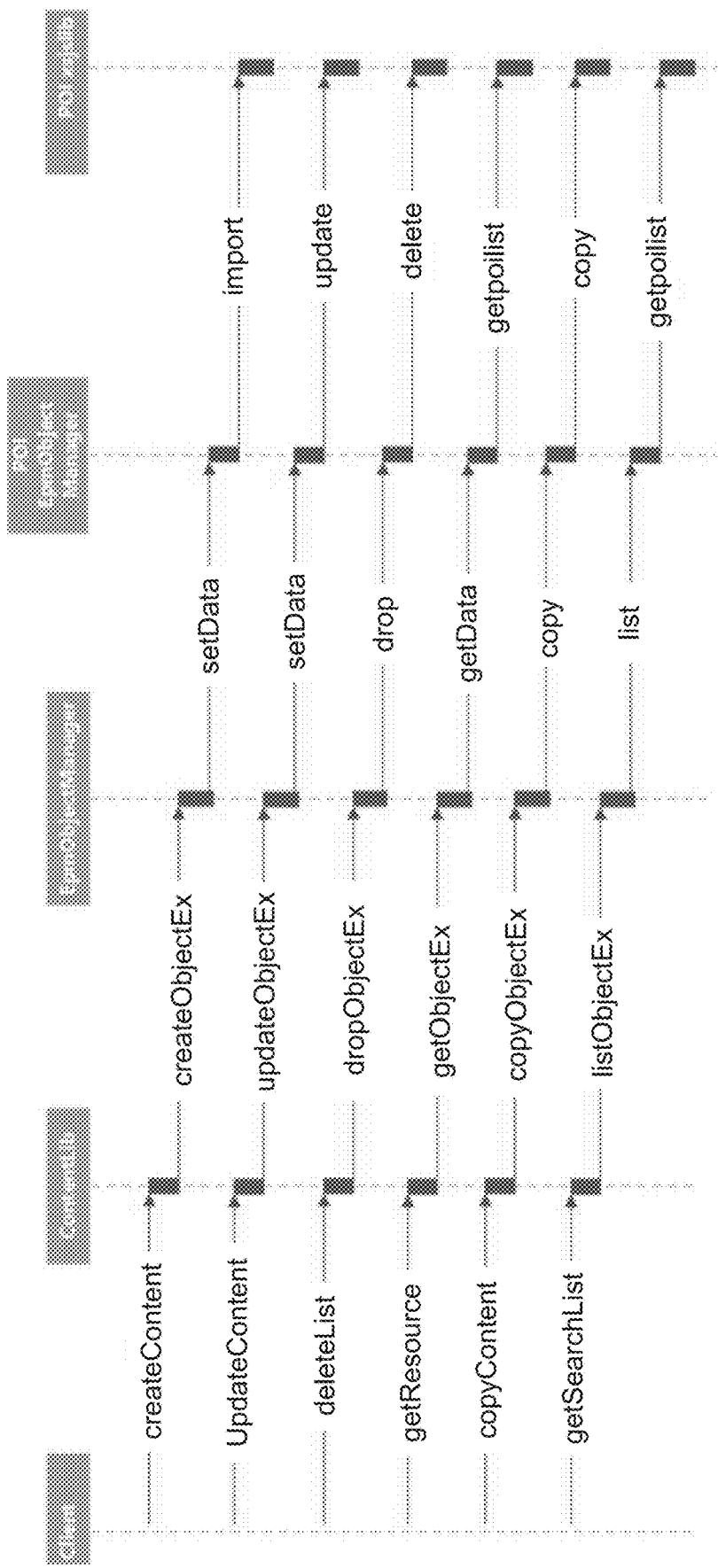
FIG. 5 is a simplified diagram illustrating the communication of information to access POI information via a model interface, according to the example.

FIG. 5 is a simplified diagram illustrating the communication of information to access POI information via a model interface, according to the example. This figure shows translation of commands between ContentLib, EPM manager, and POI manager formats.

It is noted that POI allows access permissions to be enforced by two (2) different levels of security:
1) POI-specific, and
2) application-specific.

However, POI handling according to embodiments can offer the addition of yet another level of security:
3) object-specific security.

In particular, the folder-like organizing and access control afforded by the Contentlib model interface, allows mapping of the 1) POI-specific and 2) application-specific access permissions to the ContentLib access permissions. The resulting 3) object-specific security can enforce permissions with a finer granularity than is available using just 1) and 2).

For example, object level permissions can be accessed and changed for the specific POI object, and/or for the folder containing that POI object. Such a folder-like structure allows organizing permissions in a hierarchical manner.

Examples of resulting permissions functionality can include but are not limited to:
 implying READ permission by UPDATE, DELETE, CREATE_DOC, CREATE_FOLDER;
 allowing the use of the shortcut FULL for: ASSIGN+READ+UPDATE+DELTE (+CREATE_DOC+CREATE_FOLDER)
 dragging/dropping Comma Separated Value (CSV) to POI layer;
 changing name and/or description of POI;

mapping 'Enable On Creation' of migrated to object level security (POI/Folder permissions in contentlib);

when a new POI is imported into a folder, its ASSIGN, READ, UPDATE, DELETE permissions may be inherited from that folder, and that owner also has ASSIGN permission.

Returning to FIG. 1, that particular embodiment shows the engine responsible for performing handling of POI information, as being located outside the database storing the POI library. However, this is not required.

Instead, alternative embodiments could leverage the processing power of an in-memory database engine (e.g., the in-memory database engine of the HANA in-memory database available from SAP SE), in order to perform various functions. One example of such a function is to augment a POI table to add a column, in the manner indicated above.

Figure 6:
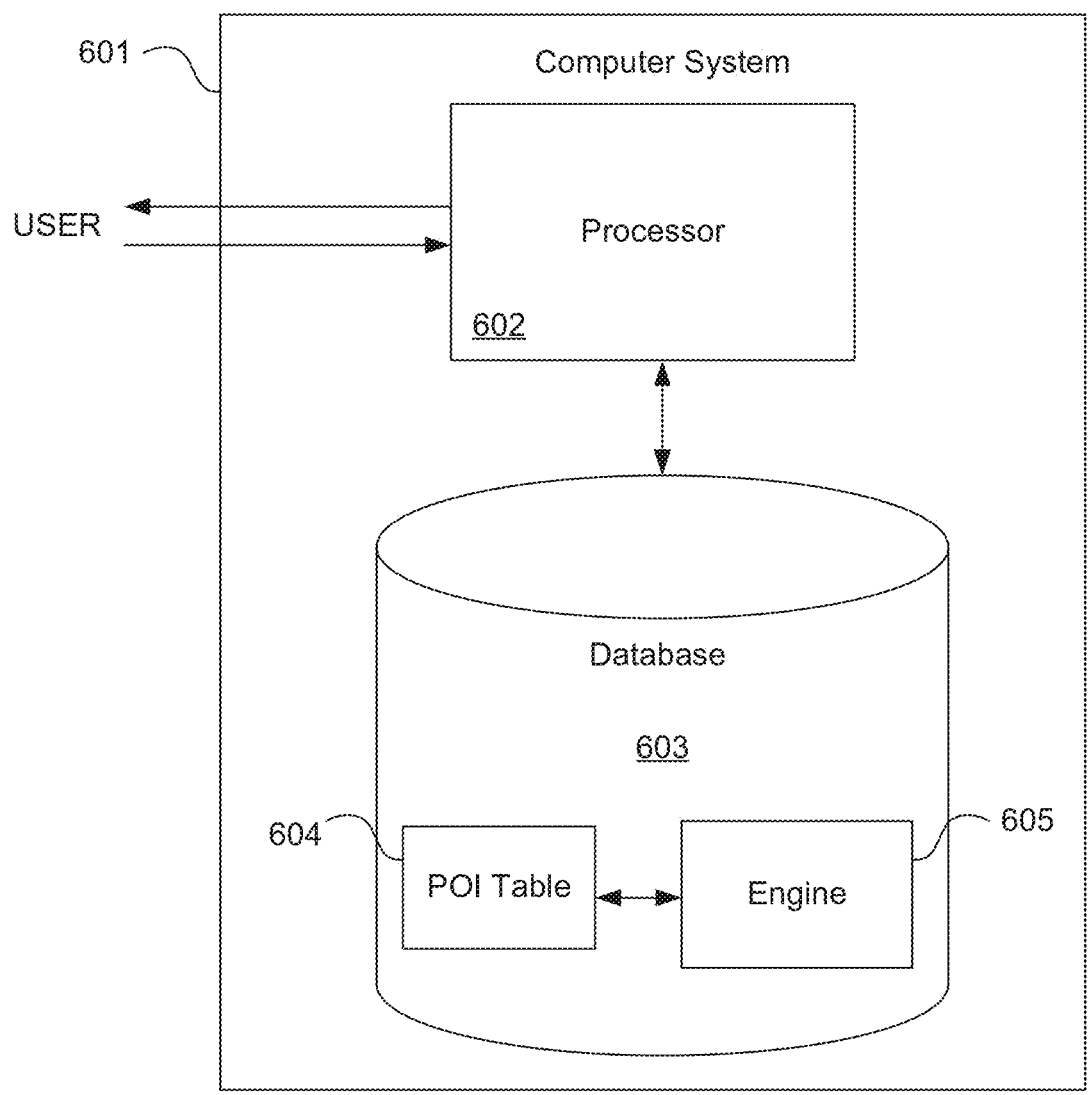
FIG. 6 illustrates hardware of a special purpose computing machine according to an embodiment that is configured to implement POI handling.

Thus, FIG. 6 illustrates hardware of a special purpose computing machine configured to implement POI handling according to an embodiment. In particular, computer system 601 comprises a processor 602 that is in electronic communication with a non-transitory computer-readable storage medium comprising a database 603. This computer-readable storage medium has stored thereon code 605 corresponding to an engine. Code 604 corresponds to a POI library. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 7:
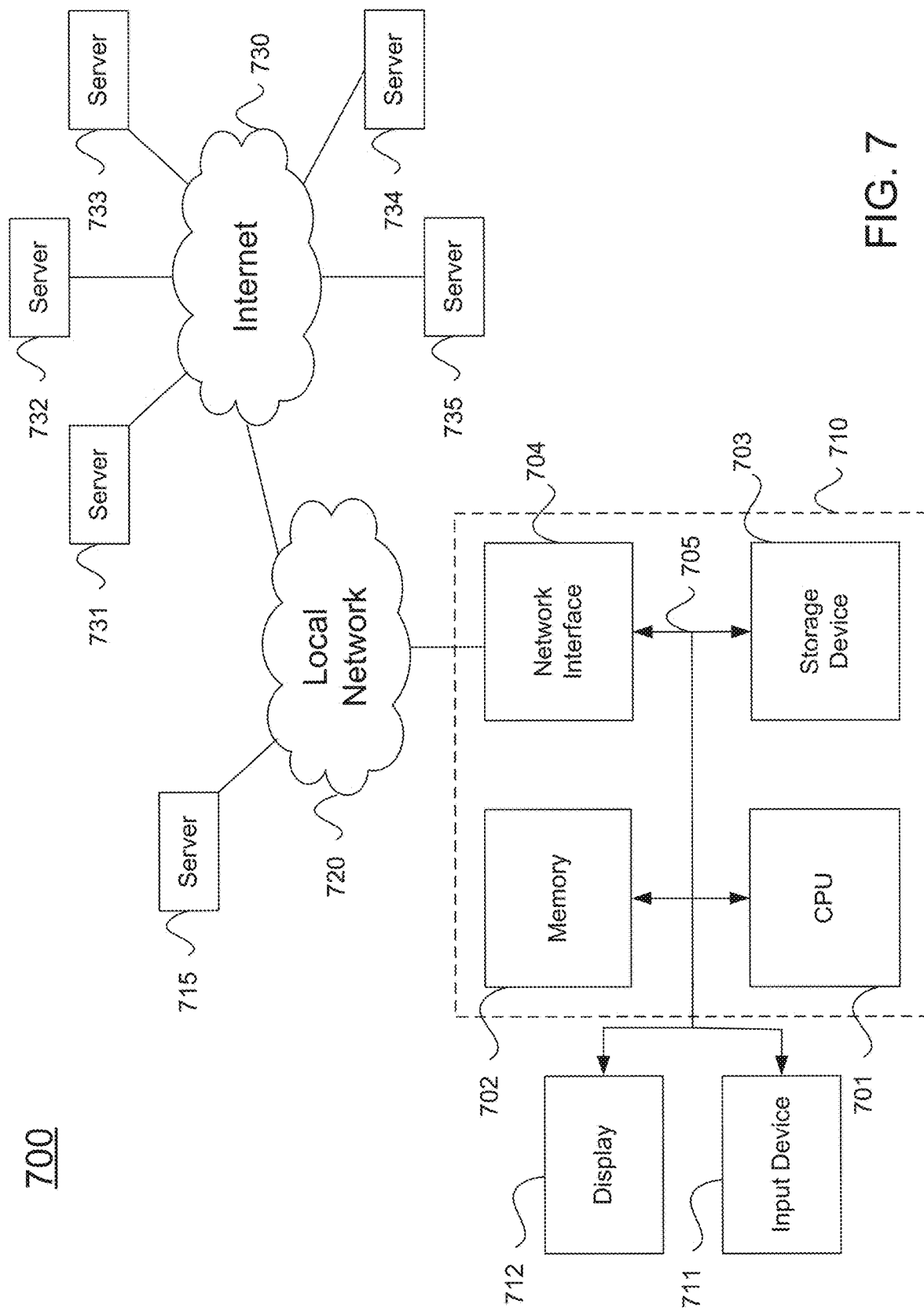
FIG. 7 illustrates an example computer system.

An example computer system 700 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    receiving a query from a geomapping interface;
    forwarding the query from the geomapping interface to a first Point-of-Interest (POI) library in communication with a database;
    receiving from the first POI library, a query result comprising a POI data object relevant to the query, the query result comprising the POI data object relevant to the query including,
        a first column with a name of the POI data object,
        a second column with a longitude of a geographic location, and
        a third column with a POI-level permission;
    creating an augmented POI data object by adding a fourth column to the POI data object, a content of the fourth column indexed by another interface recognizing a hierarchical structure; and
    communicating the augmented POI data object to the geomapping interface via said another interface implementing an object specific security permissions scheme based upon the content of the fourth column indexed by said another interface,
    wherein the object-specific security permission scheme allows dragging and dropping of a Comma Separated Value (CSV) to a layer of the augmented POI object.
2. The method as in claim 1 wherein the POI-level permission is binary.

3. The method as in claim 1 wherein the object-specific security permissions scheme references a folder functionality of said another interface.

4. The method as in claim 1 wherein the object-specific security permissions scheme permits a READ permission by an update operation, a delete operation, a create document operation, or a create folder operation.

5. The method as in claim 1 wherein the object-specific security permissions scheme includes a shortcut for a combination of an assign operation, a read operation, an update operation, and a delete operation.

6. The method as in claim 1 wherein:
the database comprises an in-memory database; and
an in-memory database engine of the in-memory database creates the augmented POI data object.

7. The method as in claim 1 wherein when a new POI is imported into a folder, the object-specific security permission scheme allows ASSIGN, READ, UPDATE, DELETE permissions for the new POI to be inherited from that folder.

8. A non-transitory computer readable storage medium embodying a computer program for performing a method, said method comprising:
receiving a query from a geomapping interface;
forwarding the query from the geomapping interface to a first Point-of-Interest (POI) library in communication with a database;
receiving from the first POI library, a query result comprising a POI data object relevant to the query, the query result comprising the POI data object relevant to the query including,
a first column with a name of the POI data object,
a second column with a longitude of a geographic location, and
a third column with a POI-level permission;
creating an augmented POI data object by adding a fourth column to the POI data object, a content of the fourth column indexed by another interface recognizing a hierarchical structure; and
communicating the augmented POI data object to the geomapping interface via said another interface implementing an object-specific security permissions scheme based upon the content of the fourth column indexed by said another interface recognizing the hierarchical structure,
wherein the object-specific security permissions scheme includes a shortcut for a combination of an assign operation, a read operation, an update operation, and a delete operation.

9. The non-transitory computer readable storage medium as in claim 8 wherein the POI-level permission is binary.

10. The non-transitory computer readable storage medium as in claim 8 wherein the object-specific security permissions scheme references a folder functionality of said another interface.

11. The non-transitory computer readable storage medium as in claim 8 wherein the object-specific security permissions scheme permits a READ permission by an update operation, a delete operation, a create document operation, or a create folder operation.

12. The non-transitory computer readable storage medium as in claim 8 wherein the object-specific security permission scheme allows dragging and dropping of a Comma Separated Value (CSV) to a layer of the augmented POI object.

13. The non-transitory computer readable storage medium as in claim 8 wherein when a new POI is imported into a folder, the object-specific security permission scheme allows ASSIGN, READ, UPDATE, DELETE permissions for the new POI to be inherited from that folder.

14. A computer system comprising:
one or more processors;
a software program, executable on said computer system, the software program configured to cause an in-memory database engine of an in-memory source database to:
receive a query from a geomapping interface;
forward the query from the geomapping interface to a first Point-of-Interest (POI) library in communication with a database;
receive from the first POI library, a query result comprising a POI data object relevant to the query, the query result comprising the POI data object relevant to the query including,
a first column with a name of the POI data object,
a second column with a longitude of a geographic location, and
a third column with a POI-level permission;
create an augmented POI data object by adding a fourth column to the POI data object, a content of the fourth column indexed by another interface recognizing a hierarchical structure; and
communicate the augmented POI data object to the geomapping interface via said another interface implementing an object-specific security permissions scheme based upon the content of the fourth column indexed by said another interface recognizing the hierarchical structure,
wherein the object-specific security permission scheme allows dragging and dropping of a Comma Separated Value (CSV) to a layer of the augmented POI object.

15. The computer system as in claim 14 wherein the POI-level permission is binary.

16. The computer system as in claim 14 wherein the object-specific security permissions scheme references a folder functionality of the other interface.

17. The computer system as in claim 14 wherein the object-specific security permissions scheme permits a READ permission by an update operation, a delete operation, a create document operation, or a create folder operation.

18. The computer system as in claim 14 wherein the object-specific security permissions scheme includes a shortcut for a combination of an assign operation, a read operation, an update operation, and a delete operation.

19. The computer system as in claim 14 wherein when a new POI is imported into a folder, the object-specific security permission scheme allows ASSIGN, READ, UPDATE, DELETE permissions for the new POI to be inherited from that folder.

\* \* \* \* \*